(12) United States Patent
Amano (10) Patent No.: US 9,816,451 B2
(45) Date of Patent: Nov. 14, 2017

(54) METHOD AND APPARATUS FOR CONTROLLING CYLINDER DEACTIVATION OF AN INTERNAL COMBUSTION ENGINE

(71) Applicant: TOYOTA JIDOSHA KABUSHIKI KAISHA, Toyota-shi, Aichi-ken (JP)

(72) Inventor: Takashi Amano, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/315,085

(22) PCT Filed: Jun. 2, 2015

(86) PCT No.: PCT/IB2015/000923
§ 371 (c)(1),
(2) Date: Nov. 30, 2016

(87) PCT Pub. No.: WO2015/185987
PCT Pub. Date: Dec. 10, 2015

(65) Prior Publication Data
US 2017/0198650 A1    Jul. 13, 2017

(30) Foreign Application Priority Data
Jun. 4, 2014    (JP) .................................. 2014-115674

(51) Int. Cl.
*B60T 7/12* (2006.01)
*F02D 41/00* (2006.01)
*F02D 41/14* (2006.01)

(52) U.S. Cl.
CPC ..... *F02D 41/0087* (2013.01); *F02D 41/0047* (2013.01); *F02D 41/1498* (2013.01); *F02D 2200/501* (2013.01)

(58) Field of Classification Search
CPC ............. F02D 41/005; F02D 2021/083; F02D 41/0055; F02D 41/0062; F02D 41/0065; B60W 2030/206; F02P 5/04
(Continued)

(56) References Cited

U.S. PATENT DOCUMENTS 7,055,311 B2 *  6/2006  Beutel ................ B01D 53/9454
                                               60/274
9,702,309 B2 *  7/2017  Haynes ............... F02D 41/0087
(Continued)

FOREIGN PATENT DOCUMENTS

DE    102008062668 A1    8/2009
EP        2508737 A1    10/2012
(Continued)

*Primary Examiner* — John Kwon
(74) *Attorney, Agent, or Firm* — Sughrue Mion, PLLC (57) ABSTRACT

A control device for an engine, the control device includes an ECU. The ECU is configured to: (i) perform switching between a first/second operation, the first operation is a first operation and the second operation is an operation with cylinder deactivation; (ii) determine operation points where vibration based on the operational state of the engine is equal to or lower than a predetermined value when performing the first/second operation; (iii) determine which one of a thermal efficiency in the operation point in case of performing the first operation and a thermal efficiency in the operation point in case of performing the second operation is higher; and (iv) control the operational state of the engine so as to operate in the operation point where the thermal efficiency is determined to be higher.

4 Claims, 7 Drawing Sheets (58) Field of Classification Search
USPC ............ 701/101, 108–112, 114; 123/406.11, 123/406.23, 406.29, 406.47, 406.48
See application file for complete search history.

(56) References Cited

U.S. PATENT DOCUMENTS

| | | |
|---|---|---|
| 2004/0035113 A1 | 2/2004 | Hanada et al. |
| 2005/0049108 A1 | 3/2005 | Nishizawa et al. |
| 2009/0177371 A1 | 7/2009 | Reinke |
| 2015/0144081 A1* | 5/2015 | Haynes ............... F02D 41/0087 123/90.11 |
| 2016/0121875 A1* | 5/2016 | Aikawa ................ B60W 10/08 701/22 |
| 2017/0211491 A1* | 7/2017 | Amano ............... F02D 41/0087 |

FOREIGN PATENT DOCUMENTS

| | | |
|---|---|---|
| JP | 61-089936 A | 5/1986 |
| JP | 2004-068759 A | 3/2004 |
| JP | 2005-067591 A | 3/2005 |
| JP | 2005-188338 A | 7/2005 |
| JP | 2010-241386 A | 10/2010 |

* cited by examiner

METHOD AND APPARATUS FOR CONTROLLING CYLINDER DEACTIVATION OF AN INTERNAL COMBUSTION ENGINE

The present application is a national stage of PCT/IB2015/000923 filed Jun. 2, 2015, and claims priority to JP 2014-115674 filed Jun. 4, 2014, both of which are incorporated herein by reference.

BACKGROUND OF THE INVENTION

1. Field of the Invention

The present invention relates to a control device and a control method for an internal combustion engine capable of performing cylinder deactivation.

2. Description of the Related Art

Internal combustion engines capable of performing switching of an operational state between an all-cylinder operation and a cylinder deactivation operation are known. In such internal combustion engines, various kinds of control are executed during the switching from the all-cylinder operation to the cylinder deactivation operation. Japanese Patent Application Publication No. 2004-068759 (JP 2004-068759 A) discloses a technique of performing control so as to compensate for insufficient torque during the cylinder deactivation operation using a motor. Japanese Patent Application Publication No. 2005-188338 (JP 2005-188338 A) discloses a technique of controlling a continuously variable transmission during the switching to the cylinder deactivation operation. Japanese Patent Application Publication No. 2005-067591 (JP 2005-067591 A) discloses a technique of setting a region where the cylinder deactivation operation is performed in consideration of a vibration level.

SUMMARY OF THE INVENTION

As a condition in which the operational states of the above-described cylinder operations and cylinder deactivation operation are switched therebetween, for example, thermal efficiency is considered. However, there may be other limitations, such as vibration during the operation of the internal combustion engine. In this case, if the operational states are switched therebetween only using the thermal efficiency as a condition, deterioration in performance of the engine operation may occur. For example, in an internal combustion engine having an exhaust gas recirculation (EGR) system, if the above operational states are switched therebetween, not only does the thermal efficiency vary in a region where exhaust gas is recirculated and a region where the exhaust gas is not recirculated, but also limitations to the vibration vary. For this reason, in order to perform suitable switching between the above operational states, it is necessary to determine in advance whether or not the operation of the internal combustion engine is switched with any condition being taken into consideration and with priority being given to any condition.

The invention provides a control device and a control method for an internal combustion engine that can appropriately perform switching between an all-cylinder operation and an operation with cylinder deactivation.

In a first aspect of the invention, a control device for an internal combustion engine, the control device includes an electronic control unit. The electronic control unit is configured to (i) perform switching between a first operation and a second operation, wherein the first operation is an operation with all cylinders being operated and the second operation is an operation with cylinder deactivation; (ii) determine an operation point where vibration based on the operational state of the internal combustion engine is equal to or lower than a predetermined value when performing the first operation, and determine an operation point where vibration based on the operational state of the internal combustion engine is equal to or lower than the predetermined value when performing the second operation; (iii) determine which one of a thermal efficiency in the operation point in case of performing the first operation and a thermal efficiency in the operation point in case of performing the second operation is higher; and (iv) control the operational state of the internal combustion engine so as to operate in the operation point where the thermal efficiency is determined to be higher.

According to the above configuration, the internal combustion engine is configured as, for example, a power element that supplies power to a driving shaft of a vehicle. The internal combustion engine is configured to be capable of performing switching between the first operation and the second operation. Specifically, the internal combustion engine is configured to be capable of performing operation by performing mutual switching between a state where all of a plurality of cylinders of the internal combustion engine are operated (namely, the all-cylinder operation) and a state where at least one of the plurality of cylinders of the internal combustion engine is deactivated and the other cylinders are operated (cylinder deactivation).

According to the above configuration, a device controls the above-described internal combustion engine, and executes, particularly, the control during the switching between the first operation and the second operation. The control device for an internal combustion engine executes processing to be described below in detail when it should be determined whether or not the operation of the internal combustion engine that is performing the first operation is switched to the second operation or when it should be determined whether or not the operation of the internal combustion engine that is performing the second operation is switched to the first operation.

According to the above configuration, during the operation of the control device for an internal combustion engine, first, the operation points where vibration resulting from the operational state of the internal combustion engine has a predetermined value or lower are determined by an ECU. The "vibration based on the operational state of the internal combustion engine" is vibration obtained as the internal combustion engine operates, and includes vibration caused in other regions (for example, respective regions of a vehicle on which the internal combustion engine is mounted) by the vibration of the internal combustion engine itself being transmitted thereto, in addition to including the vibration of the internal combustion engine itself. The "vibration" herein is vibration in wide-ranging concept including not only mere vibration but noise caused by the vibration. Moreover, the "predetermined value" is a threshold for determining whether or not vibration is in a large state to such a degree that trouble is caused, and may be appropriately set in accordance with the vibration performance (for example, a vibration value where the drivability of the vehicle is not lowered) required for the internal combustion engine.

The operation points where the vibration resulting from the operational state of the internal combustion engine has the predetermined value or lower are selected from, for example, operation points that the internal combustion engine can take in order to output the required driving power. Whether or not there are the operation points where the vibration has the predetermined value or lower may be determined by predicting vibration that can be generated, for example, from a vehicle speed, the required driving power, or the like. The prediction of the vibration can be performed, for example, using a map or the like created by previous simulation or the like.

The above-described operation points are determined in case of performing the first operation and in case of performing the second operation, respectively. That is, the operation point in case of performing the first operation and the operation point in case of performing the second operation are separately determined. In addition, the number of the operation points where the vibration resulting from the operational state of the internal combustion engine has the predetermined value or lower may be determined as being plural (for example, three or more) in case of performing the second operation and in case of performing the first operation, respectively.

The plurality of operation points where the vibration resulting from the operational state of the internal combustion engine has the predetermined value or lower are typically determined as operation points where the same driving power can be output. However, the internal combustion engine takes different operation points even in a case where the same driving power is intended to be output, in the first operation and the second operation. The magnitude of the vibration also varies in the first operation and the second operation. Therefore, the operation points where the vibration resulting from the operational state of the internal combustion engine has the predetermined value or lower are determined as mutually different operation points in case of the first operation and in case of the second operation.

If the operation points where the vibration resulting from the operational state of the internal combustion engine has the predetermined value or lower are determined, thermal efficiency determination means determines which one of the thermal efficiency of the operation point in case of performing the first operation and the thermal efficiency of the operation point in case of performing the second operation is higher. The "thermal efficiency" is a parameter equivalent to the fuel consumption rate of the internal combustion engine, and the level thereof can be determined, for example, using the map created by previous simulation or the like.

If the operation point with a higher thermal efficiency is determined, the operational state of the internal combustion engine is controlled by control means so as to realize the operation point with a higher thermal efficiency. Specifically, the internal combustion engine is controlled so as to be switched to an operational state corresponding to the operation point where the thermal efficiency is higher and the vibration resulting from the operational state of the internal combustion engine has the predetermined value or lower, out of the first operation and the second operation, and so as to operate in the operation point. More specifically, for example, when a vibration avoidance operation point in case of performing the first operation is determined to have thermal efficiency higher than the operation point where the vibration resulting from the operational state of the internal combustion engine in case of performing the second operation has the predetermined value or lower, the internal combustion engine is switched to the first operation, and operates in the operation point in case of performing the first operation. On the other hand, for example, when a vibration avoidance operation point in case of performing the second operation is determined to have thermal efficiency higher than the operation point where the vibration resulting from the operational state of the internal combustion engine in case of performing the first operation has the predetermined value or lower, the internal combustion engine is switched to the second operation, and operates in the operation point in case of performing the second operation.

As described above, according to the control device, the operational state of the internal combustion engine is determined after both the vibration and the thermal efficiency are taken into consideration. Therefore, it is possible to realize an operation with higher thermal efficiency, suppressing the generation of vibration.

In the internal combustion engine may include an exhaust gas recirculation system that recirculates exhaust gas to an intake side. In the control device, the electronic control unit may be configured to determine the operation point based on whether or not exhaust gas recirculation is performed during the operation of the internal combustion engine.

According to the above configuration, the internal combustion engine is provided with an EGR system, and is enabled to perform a recirculation operation according to the situation.

According to the above configuration, when the operation points where the vibration resulting from the operational state of the internal combustion engine has the predetermined value or lower are determined, whether or not the internal combustion engine performs the recirculation operation is taken into consideration. The expression "based on whether or not the exhaust gas recirculation is performed" means that various changes that can occur as the internal combustion engine performs the recirculation operation are reflected in methods for determining the operation points where the vibration resulting from the operational state of the internal combustion engine has the predetermined value or lower. For example, a difference is caused in the generation of the vibration in a case where the internal combustion engine does not perform the recirculation operation. Specifically, for example, even if the vehicle speed or the required driving power is the same, the magnitude of vibration to be generated varies depending on whether or not the recirculation operation is performed.

Therefore, if whether or not the recirculation operation is performed is taken into consideration, it is possible to more suitably determine the vibration avoidance operation point. In other words, determination of an unsuitable operation point can be prevented by not taking into consideration whether or not the recirculation operation is performed.

In the control device, the electronic control unit may be configured to determine which one of the thermal efficiency in the operation point in case of performing the first operation and the thermal efficiency in the operation point in case of performing the second operation is higher, based on a change in the thermal efficiency in case of performing the exhaust gas recirculation during the operation of the internal combustion engine with respect to the thermal efficiency in case of not performing the exhaust gas recirculation during the operation of the internal combustion engine.

In this case, when the thermal efficiency of the operation points is determined, a change in the thermal efficiency caused by the exhaust gas recirculation is taken into consideration. In addition, considering the expression "a change in the thermal efficiency in case of performing the exhaust gas recirculation during the operation of the internal combustion engine with respect to the thermal efficiency in case of not performing the exhaust gas recirculation during the operation of the internal combustion engine" means that a change in the thermal efficiency by the internal combustion engine being operated with the exhaust gas recirculation is reflected in methods for determining the thermal efficiency.

For example, when the internal combustion engine is operated with the exhaust gas recirculation, the thermal efficiency generally becomes higher compared to a case where the exhaust gas recirculation is not performed. Hence, an increase in the thermal efficiency by the exhaust gas recirculation may be determined as a plus factor with respect to the thermal efficiency of the operation point where the exhaust gas recirculation is determined to be performed during the operation of the internal combustion engine.

As described above, if whether or not the operation point is the operation point where the exhaust gas recirculation is performed during the operation of the internal combustion engine is taken into consideration, it is possible to more precisely determine the level of the thermal efficiency. In other words, performance of inaccurate determination can be prevented by not taking into consideration whether or not the operation point is the operation point where the exhaust gas recirculation is performed during the operation of the internal combustion engine.

In a second aspect of the invention, a control method for an internal combustion engine, the control method includes switching between a first operation and a second operation, wherein the first operation is an operation with all cylinders being operated and the second operation is an operation with cylinder deactivation; determining an operation point where vibration based on the operational state of the internal combustion engine is equal to or lower than a predetermined value when performing the first operation, and determine an operation point where vibration based on the operational state of the internal combustion engine is equal to or lower than a predetermined value when performing the second operation; determining which one of a thermal efficiency in the operation point in case of performing the first and a thermal efficiency in the operation point in case of performing the second operation is higher; and controlling the operational state of the internal combustion engine so as to operate in the operation point where the thermal efficiency is determined to be higher.

BRIEF DESCRIPTION OF THE DRAWINGS

Features and advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of a control device and a control method for an internal combustion engine will be described.

An internal combustion engine (hereinafter also referred to as an engine) related to the present embodiment, and a configuration around the engine will be described with reference to a schematic configuration diagram of FIG. 1.

Figure 1:
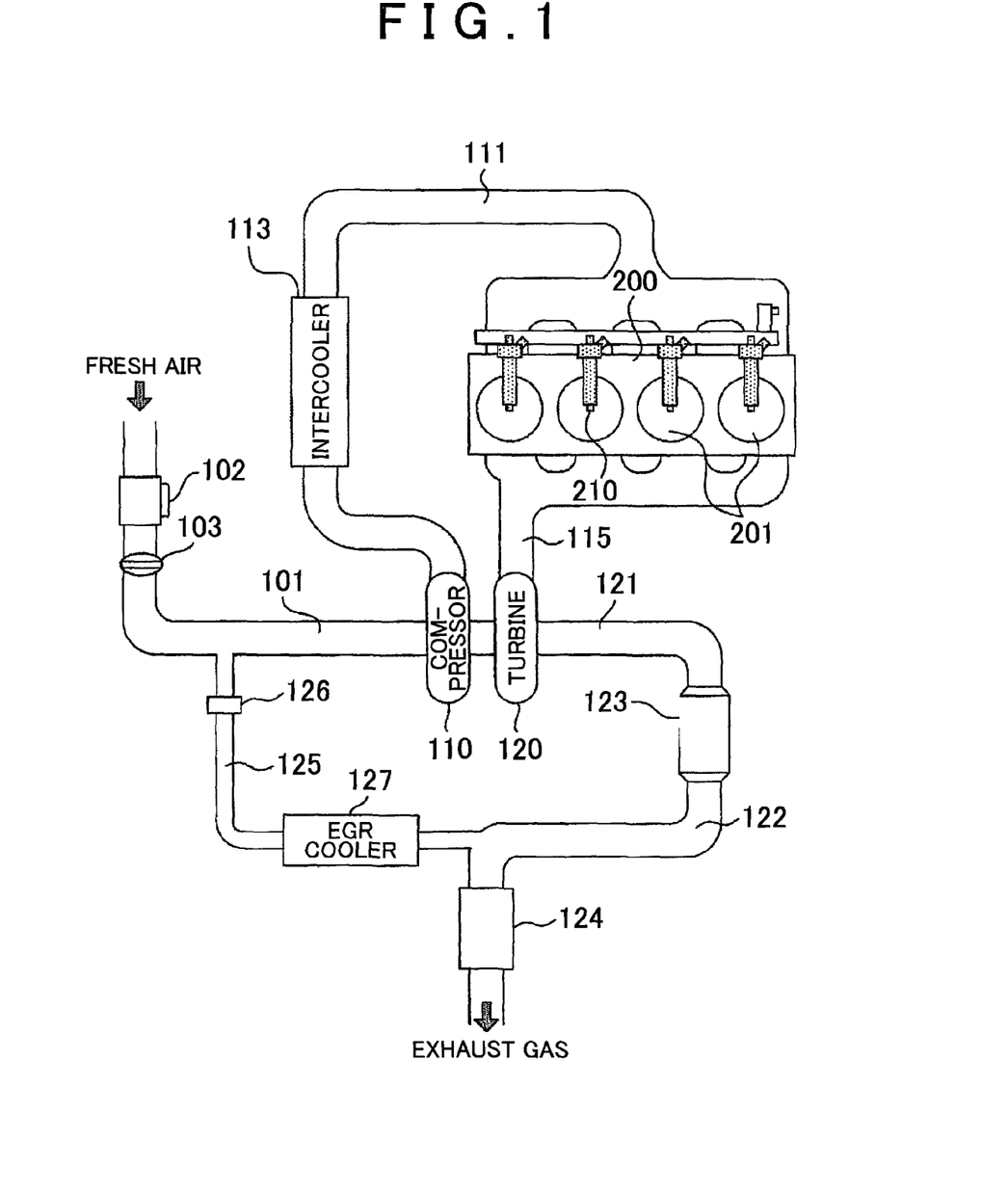
FIG. 1 is a schematic configuration diagram illustrating a configuration around an engine related to an embodiment of the invention.

In FIG. 1, an engine 200 related to the present embodiment is a gasoline engine that is an example of the "internal combustion engine". The engine 200 is configured to function as a main power source of a vehicle (including a hybrid vehicle). The internal combustion engine has a plurality of cylinders and is configured to be capable of extracting power, which is generated when an air-fuel mixture including fuel is combusted, as driving power appropriately via, for example, physical or mechanical transmission means, such as pistons, connecting rods, and a crankshaft, in combustion chambers inside the cylinders. The fuel includes, for example, various kinds of fuel, such as gasoline, gas oil, or alcohol.

The engine 200 is configured as a supercharged engine equipped with a compressor 110 and a turbine 120. The compressor 110 compresses air that flows in, and supplies the compressed air to the downstream. The turbine 120 rotates using exhaust air supplied via an exhaust pipe 115 from the engine 200 as power. The turbine 120 is coupled to the compressor 110 via a shaft, and is configured to be mutually integrally rotatable. That is, a turbocharger is constituted of the turbine 120 and the compressor 110.

The engine 200 is, for example, an in-line four-cylinder engine in which four cylinders 201 are arranged in tandem in a cylinder block. Although detailed illustration is omitted, the engine 200 is configured to be capable of converting a reciprocal motion of a piston, which is generated when an air-fuel mixture of air and fuel is combusted inside each cylinder 201, into a rotational motion of the crankshaft via a connecting rod.

An air flow meter 102 is provided in an intake pipe 101 on an inlet side (namely, on the upstream side of the compressor 110) in the compressor 110. The air flow meter 102 is configured to be capable of detecting the amount of air taken in from the outside. An intake throttle valve 103 is provided in the subsequent stage of the air flow meter 102. The intake throttle valve 103 is, for example, an electronic-control-type valve, and is configured such that the opening/closing operation thereof is controlled by a throttle valve motor (not illustrated). The amount of air that flows into the intake pipe 101 is regulated by the opening/closing operation of the intake throttle valve 103.

An intercooler 113 is provided in an intake pipe 111 on an outlet side (namely, the downstream side of the compressor 110) in the compressor 110 and on an intake side (namely, on the upstream side of the cylinders 201) in the engine 200. The intercooler 113 is configured to be capable of cooling intake air and enhancing the supercharge efficiency of the air.

An air-fuel mixture obtained by mixing air supplied via the intake pipe 111 with fuel injected and supplied from an injector 210 is taken into the a combustion chamber within a cylinder 201 in the engine 200. The air-fuel mixture guided to the inside of the cylinder 201 from the intake side is ignited by an ignition plug (not illustrated), compression ignition, or the like, and an explosion process is performed within the cylinder 201. If the explosion process is performed, a burned air-fuel mixture (including an air-fuel mixture in a partially unburned state) is discharged to an exhaust port (not illustrated) in an exhaust process following the explosion process. Exhaust air discharged to the exhaust port is guided to the exhaust pipe 115.

An EGR system in addition to a start converter 123 and an aftertreatment device 124 is provided in the exhaust pipe 121 on the outlet side (namely, on the downstream side of the turbine 120) in the turbine 120. The EGR system is constituted of an EGR pipe 125, an EGR valve 126, and an EGR cooler 127.

The start converter 123 is configured to include, for example, an oxidation catalyst. The start converter 123 purifies substances contained in exhaust air that has passed through the turbine 120.

The aftertreatment device 124 is provided on the downstream side of the start converter 123 in the exhaust pipe 122, and collects and reduces particulate matter contained in exhaust air.

The EGR pipe 125 is configured to be capable of recirculating exhaust air downstream of the start converter 123 to the intake pipe 101 that is the inlet side of the compressor 110. The EGR valve 126 is provided on the EGR pipe 125, and is enabled to regulate the amount of EGR gas. The EGR cooler 127 that cools the recirculated EGR gas is provided on the EGR pipe 125.

Figure 2:
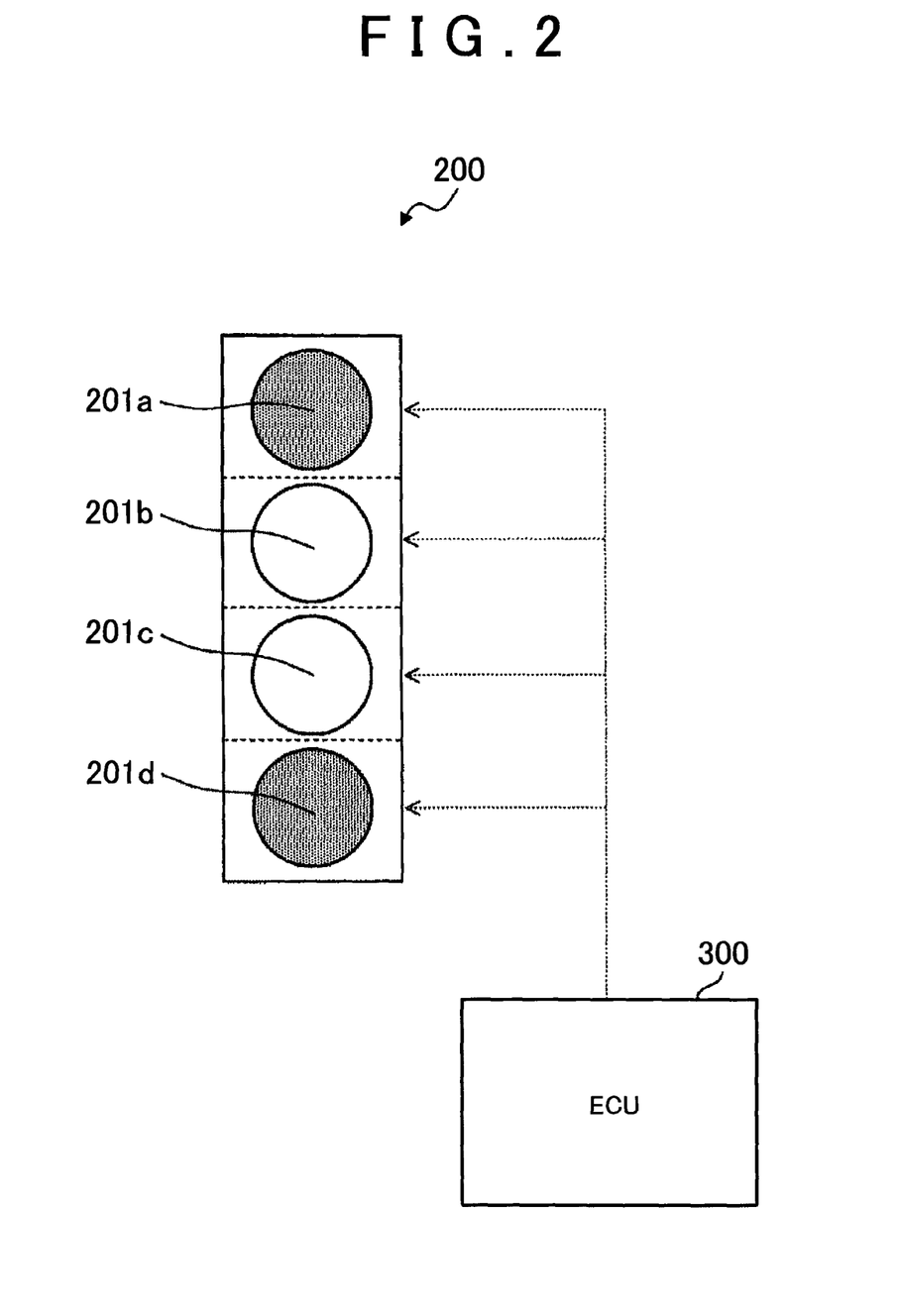
FIG. 2 is a conceptual diagram illustrating an example of a second operation of an in-line engine.
Figure 3:
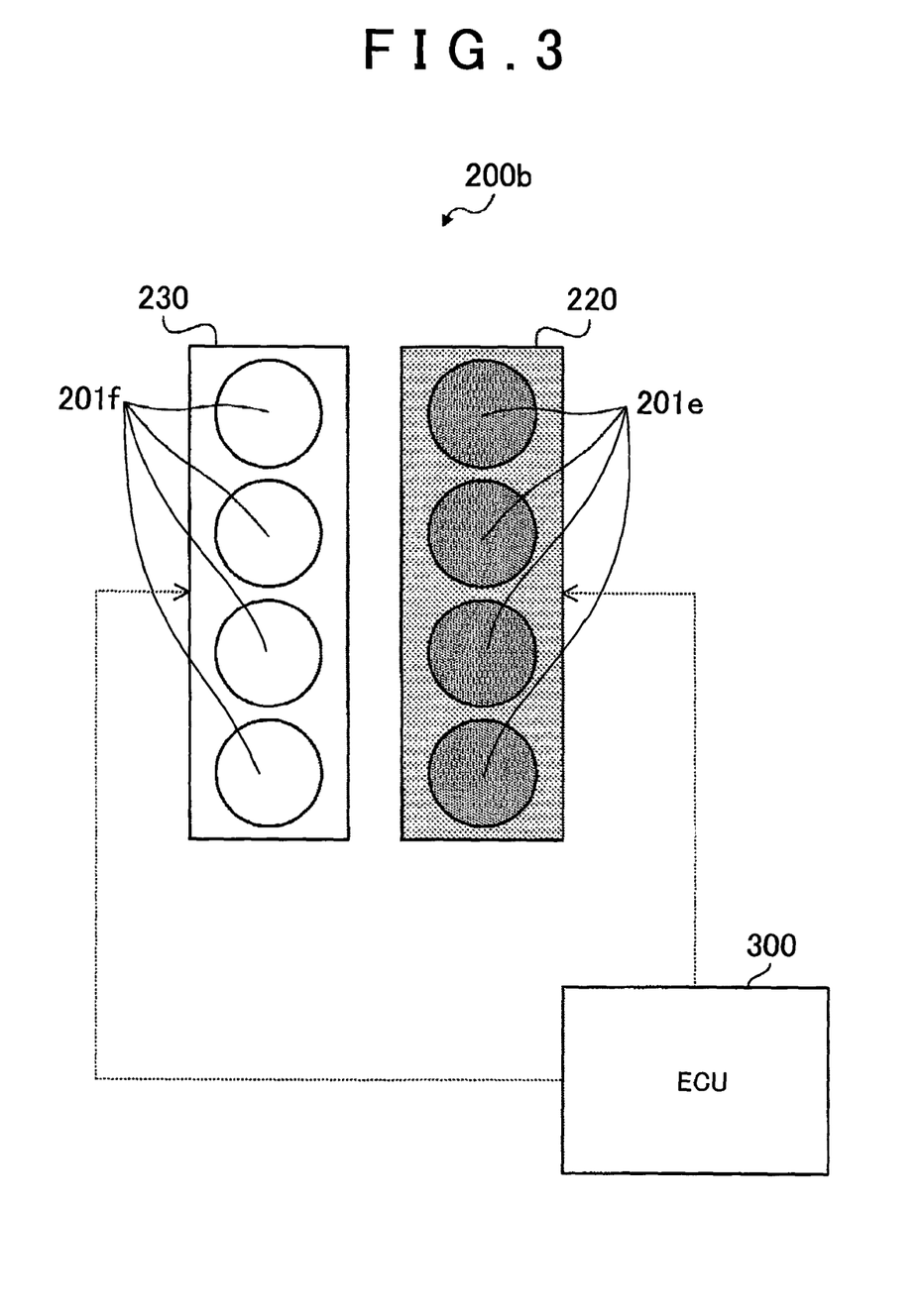
FIG. 3 is a conceptual diagram illustrating an example of the second operation of a V-type engine.

Next, cylinder deactivation executed in the above-described engine 200 will be described with reference to FIGS. 2 and 3. FIG. 2 is a conceptual diagram illustrating an example of an engine operation with cylinder deactivation of an in-line engine. FIG. 3 is a conceptual diagram illustrating an example of cylinder deactivation of a V-type engine.

In FIGS. 2 and 3, the engine 200 related to the present embodiment is enabled to perform the engine operation with cylinder deactivation through the control by an electronic control unit (ECU) 300. The engine operation with cylinder deactivation (hereinafter, a second operation) is to operate the engine 200 in a state where some cylinders 201 are deactivated among the plurality of cylinders 201.

In the in-line engine 200 illustrated in FIG. 2, the ECU 300 outputs operation commands or deactivation commands to cylinders 201a, 201b, 201c, and 201d, respectively, thereby realizing the second operation. In the example illustrated in this drawing, operation commands are output to the shaded cylinders 201a and 201d, respectively, and deactivation commands are output to the unshaded cylinders 201b and 201c, respectively. In this case, the operation of the cylinders 201b and 201c to which the deactivation commands are output are temporarily deactivated, and the second operation using only the cylinders 201a and 201d to which the operation commands are output is performed.

In the V-type engine 200b illustrated in FIG. 3, the ECU 300 outputs an operation command or a deactivation command to a right bank 220 and a left bank 230, respectively, thereby realizing the second operation. In the example illustrated in this drawing, the operation command is output to the shaded right bank 220, and the deactivation command is output to the unshaded left bank 230. In this case, the operation of cylinders 201f of the left bank 230 to which the deactivation command is output is temporarily deactivated, and the second operation using only cylinders 201e of the right bank 220 to which the operation command is output is performed.

By appropriately using the above-described second operation, it is possible to improve fuel efficiency, for example, compared to a case where an all-cylinder operation (hereinafter, a first operation) is always performed.

Next, a specific configuration of the ECU related to the embodiment will be described with reference to FIG. 4. Here, FIG. 4 is a block diagram illustrating the configuration of the ECU related to the embodiment.

Figure 4:
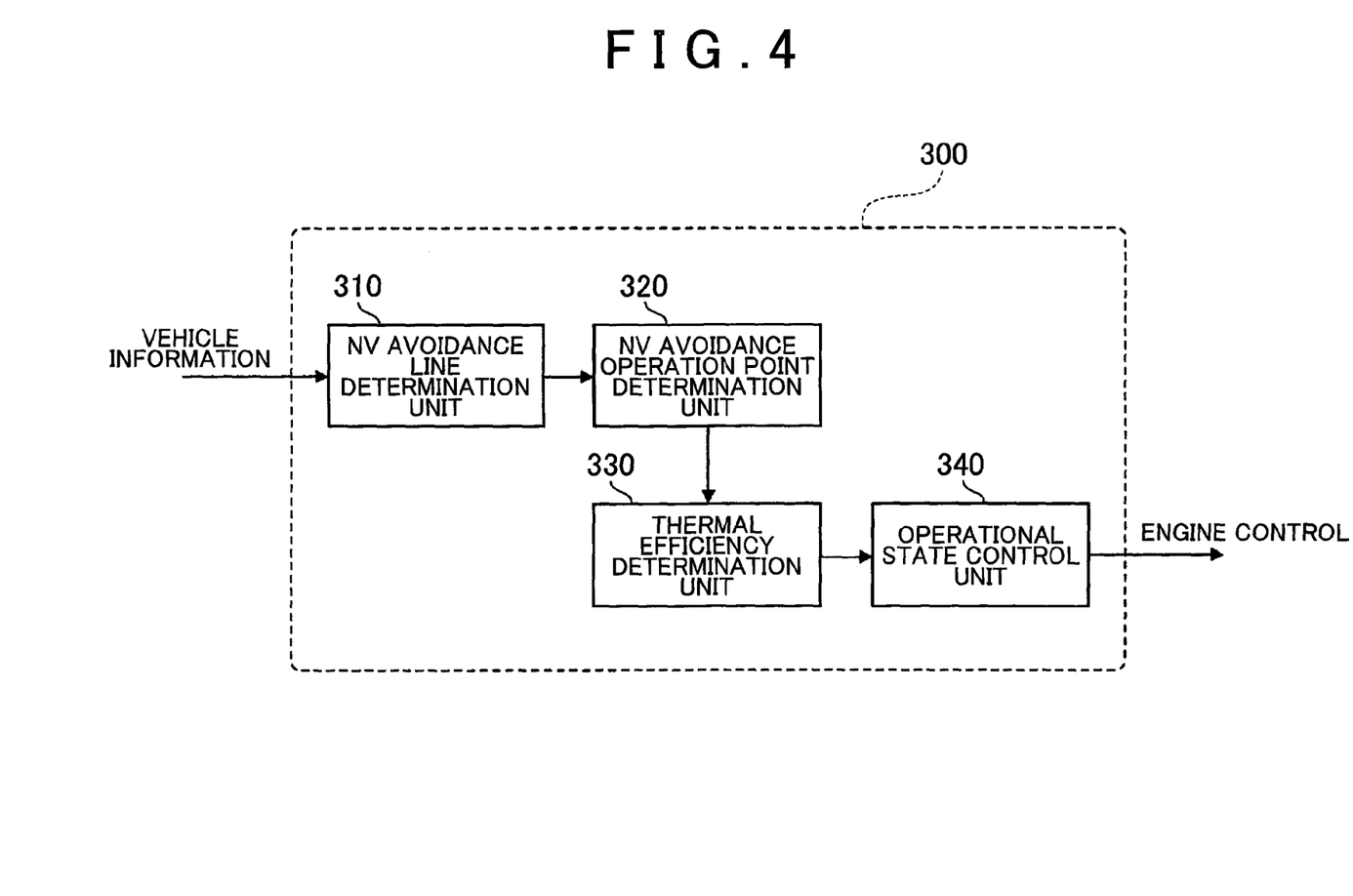
FIG. 4 is a block diagram illustrating the configuration of an ECU related to the embodiment.

In FIG. 4, the ECU 300 is configured to include an NV avoidance line determination unit 310, an NV avoidance operation point determination unit 320, a thermal efficiency determination unit 330, and an operational state control unit 340.

The NV avoidance line determination unit 310 determines an NV avoidance line showing the boundary of an operation point for making vibration reach a predetermined value or lower, on the basis of vehicle information (for example, information or the like on a vehicle speed, required driving power, or the EGR) to be input. The NV avoidance line determination unit 310 determines an NV avoidance line in case of performing the first operation and an NV avoidance line in case of performing the second operation, respectively. That is, the NV avoidance line determination unit 310 determines at least two NV avoidance lines.

The NV avoidance line determination unit 310 stores a plurality of NV avoidance lines created, for example, by previous simulation or the like. The NV avoidance line determination unit 310 selects and determines an NV avoidance line according to vehicle information (namely, the traveling situation of a current vehicle) from the plurality of stored NV avoidance lines. Otherwise, the NV avoidance line determination unit 310 may be configured to calculate an NV avoidance line every time, using vehicle information to be input. The NV avoidance line determined in the NV avoidance line determination unit 310 is output to the NV avoidance operation point determination unit 320.

The NV avoidance operation point determination unit 320 determines an operation point, which is present within an NV avoidance line among operation points capable of outputting required driving power, as an NV avoidance operation point. The NV avoidance operation point determination unit 320 determines an NV avoidance operation point in case of performing the first operation and an NV avoidance operation point in case of performing the second operation, respectively. That is, the NV avoidance operation point determination unit 320 determines at least two NV avoidance operation points. The NV avoidance operation points determined in the NV avoidance operation point determination unit 320 are output to the thermal efficiency determination unit 330.

Although the method for determining NV avoidance operation points using NV avoidance lines has been described in the present embodiment, NV avoidance operation points may be determined by other methods as long as operation points where vibration reaches a predetermined value or lower can be determined.

The thermal efficiency determination unit 330 determines which one among the operation points determined in the NV avoidance operation point determination unit 320 has higher thermal efficiency. That is, it is determined which one of thermal efficiencies in case of performing the first operation and in case of performing the second operation is higher. A determination result in the thermal efficiency determination unit 330 is output to the operational state control unit 340.

The operational state control unit 340 controls the operational state of the engine 200 in accordance with the determination result in the thermal efficiency determination unit 330. Specifically, the first operation and the second operation of the engine 200 are switched therebetween so as to provide an operational state corresponding to an NV avoidance operation point where thermal efficiency is determined to be higher in the thermal efficiency determination unit 330, and control is performed such that the engine 200 operates at the NV avoidance operation point.

Respective kinds of processing executed in the respective units (namely, the NV avoidance line determination unit 310, the NV avoidance operation point determination unit 320, the thermal efficiency determination unit 330, and the operational state control unit 340) of the above-described the ECU 300 will be described below in more detail.

Figure 5:
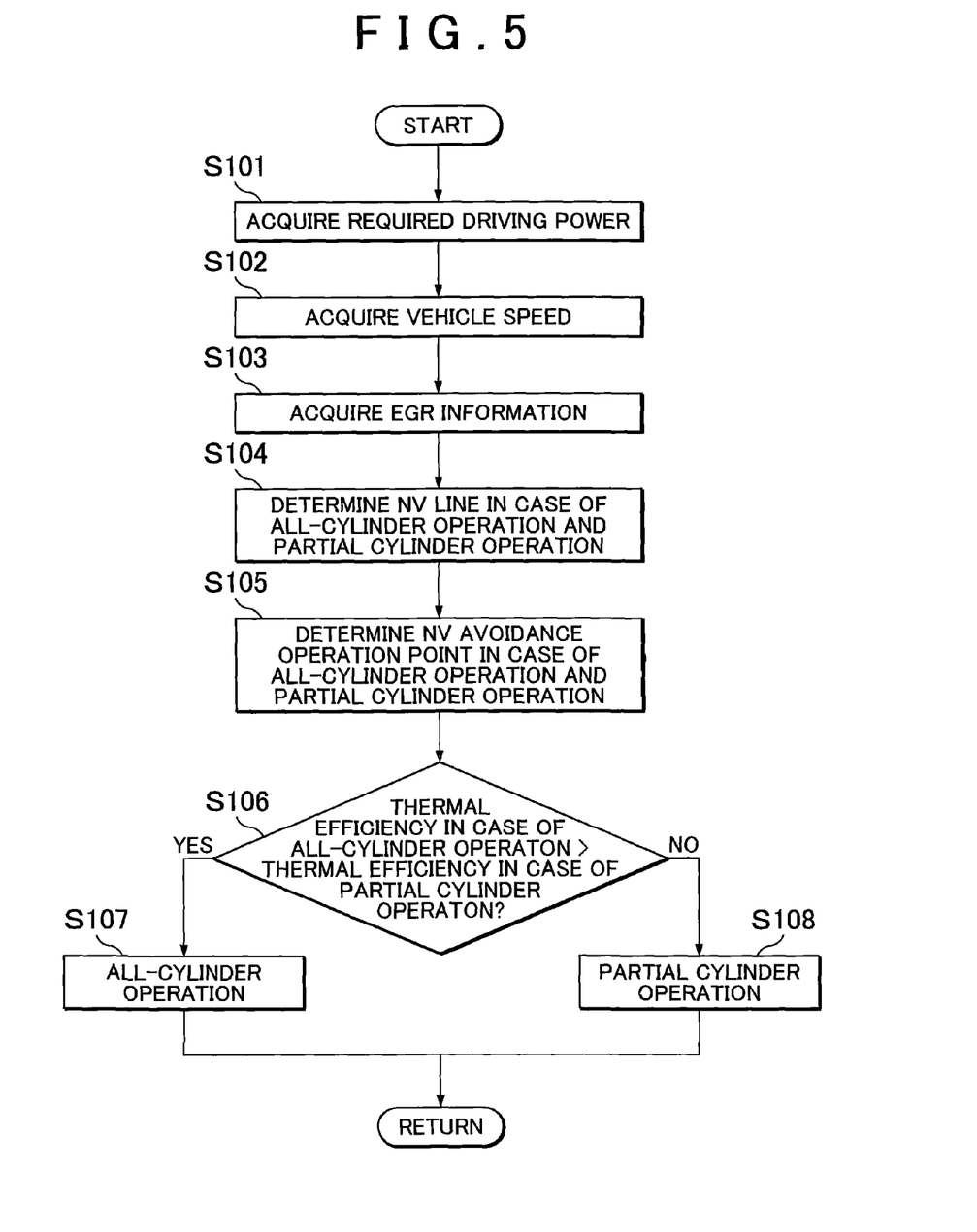
FIG. 5 is a flowchart illustrating the operation of a control device for an internal combustion engine related to the embodiment.

The operation of the control device for the internal combustion engine related to the embodiment will be described with reference to FIG. 5. FIG. 5 is a flowchart illustrating the operation of the control device for the internal combustion engine related to the embodiment. In addition, in the following, processing deeply related to the present embodiment in the processing that the ECU 300 functioning as the control device for the internal combustion engine executes will be described in detail, and the description of the other general processing will be appropriately omitted.

In FIG. 5, during the operation of the control device for the internal combustion engine related to the present embodiment, required driving power is first acquired by the NV avoidance line determination unit 310 (Step S101). The required driving power is, for example, a value determined in accordance with the amount of stepping on an accelerator pedal by a vehicle driver, and a vehicle speed.

Subsequently, a vehicle speed is acquired by the NV avoidance line determination unit 310 (Step S102). The vehicle speed is determined, for example, by a vehicle speed sensor (not illustrated) and is output to the ECU 300.

Further, EGR information is acquired by the NV avoidance line determination unit 310 (Step S103). The EGR information is information showing whether or not the engine 200 is performing EGR operation, and for example, is information showing the opening degree of the EGR valve 126 (refer to FIG. 1).

In the NV avoidance line determination unit 310 that has acquired the required driving power, the vehicle speed, and the EGR information, NV avoidance lines are determined using the respective acquired parameters (Step S104). The NV avoidance lines are determined in case of performing the first operation and in case of performing the second operation, respectively.

If the NV avoidance lines are determined, NV avoidance operation points that are present on the NV avoidance lines are determined by the NV avoidance operation point determination unit 320 (Step S105). The NV avoidance operation points are determined in case of performing the first operation and in case of performing the second operation, respectively. Specifically, the NV avoidance operation points in case of performing the first operation are determined using the NV avoidance lines in case of performing the first operation. Similarly, the NV avoidance operation points in case of performing the second operation are determined using the NV avoidance lines in case of performing the second operation.

If the NV avoidance operation points are determined, which one of thermal efficiency of the NV avoidance operation point in case of performing the first operation and the NV avoidance operation point in case of performing the second operation is higher is determined by the thermal efficiency determination unit 330 (Step S106).

When the NV avoidance operation point in case of performing the first operation is determined to have higher thermal efficiency than the NV avoidance operation point in case of performing the second operation (Step S106: YES), the engine 200 is controlled such that the first operation is realized by the operational state control means 340 and is controlled so as to operate in the NV avoidance operation point in case of performing the first operation (Step S107).

On the other hand, when the NV avoidance operation point in case of performing the second operation is determined to have higher thermal efficiency than the NV avoidance operation point in case of performing the first operation (Step S106: NO), the engine 200 is controlled such that the second operation is realized by the operational state control means 340, and is controlled so as to operate in the NV avoidance operation point in case of performing the second operation (Step S108).

According to the above-described series of processing, the operational state of the engine 200 is determined after both the vibration and the thermal efficiency are taken into consideration. Therefore, it is possible to realize an operation with higher thermal efficiency, suppressing the generation of vibration.

Figure 6:
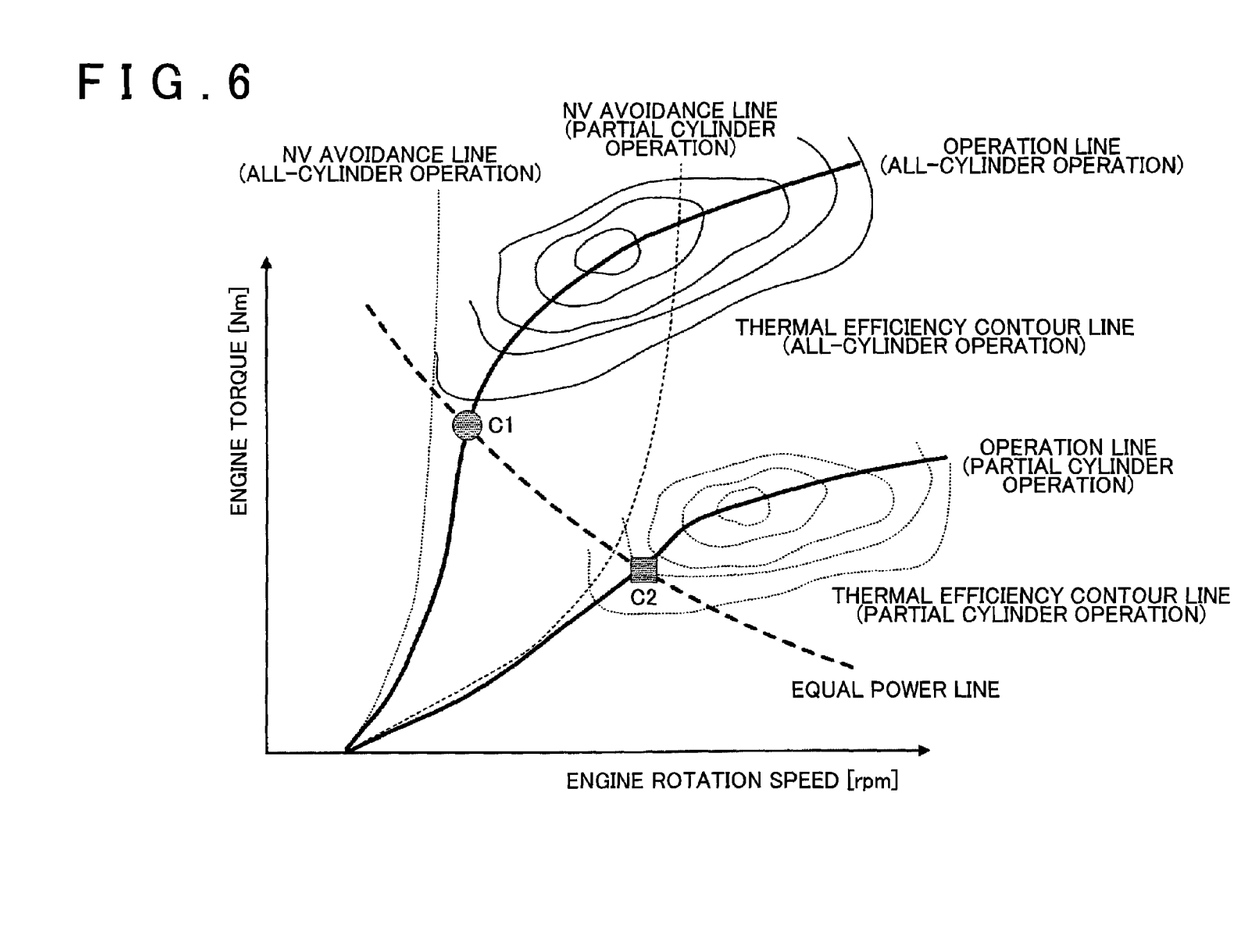
FIG. 6 is a graph illustrating an NV avoidance operation point determination method and a thermal efficiency determination method during EGR-less operation related to the embodiment.
Figure 7:
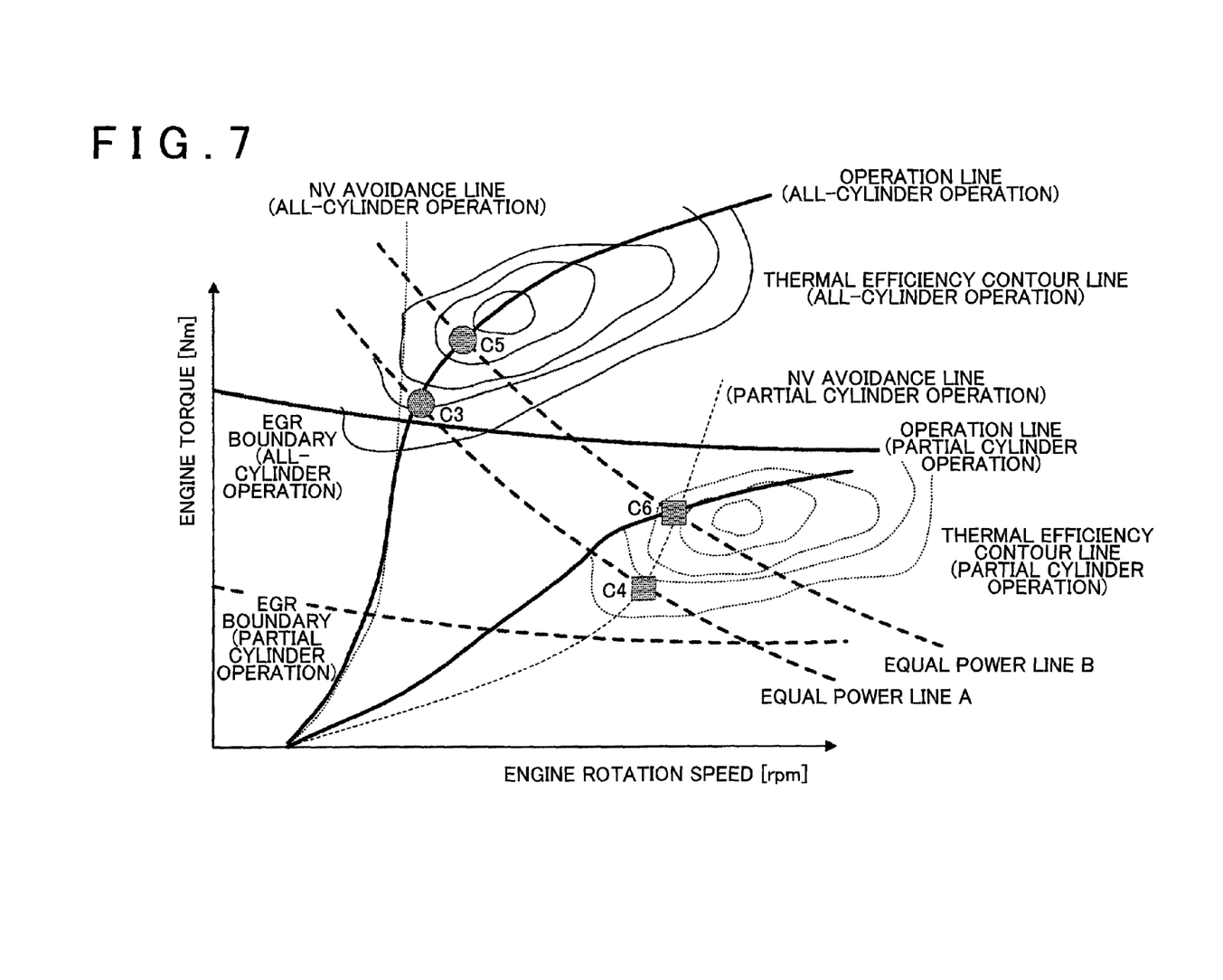
FIG. 7 is a graph illustrating the NV avoidance operation point determination method and the thermal efficiency determination method during EGR operation related to the embodiment.

Finally, specific control examples of the control device for the internal combustion engine related to the embodiment will be described in detail with reference to FIGS. 6 and 7. Here, FIG. 6 is a graph illustrating the NV avoidance operation point determination method and the thermal efficiency determination method during EGR-less operation. FIG. 7 is a graph illustrating the NV avoidance operation point determination method and the thermal efficiency determination method during the EGR operation.

In FIG. 6, an operation point C1 in case of performing the first operation and the operation point C2 in case of performing the second operation are illustrated as the NV avoidance operation points in case of performing EGR-less operation, for example, during cold transition or the like. The operation points C1 and C2 are respectively determined as two operation points present on an equal power line from on an operation line in case of performing the first operation and an operation line in case of performing the second operation. That is, intersection points between the equal power line according to the required driving power and the respective operation lines are determined as the NV avoidance operation points.

The NV avoidance operation point C1 in case of performing the first operation is determined as an operation point within an NV avoidance line (namely, on the right of the NV avoidance line) in case of performing the first operation. Similarly, the NV avoidance operation point C2 in case of performing the second operation is determined as an operation point within an NV avoidance line (namely, on the right of the NV avoidance line) in case of performing the second operation.

If the thermal efficiencies of the NV avoidance operation points C1 and C2 are compared with each other, it can be understood that the NV avoidance operation point C2 in case of performing the second operation is located further inside a thermal efficiency contour line than the NV avoidance operation point C1 in case of performing the first operation. Hence, the thermal efficiency $\eta_{C2}$ of the NV avoidance operation point C2 in case of performing the second operation is determined to be higher than the thermal efficiency $\eta_{C1}$ of the NV avoidance operation point C1 in case of performing the first operation (namely, $\eta_{C1} < \eta_{C2}$).

As a result, in the engine 200, the second operation is realized, and operation in the NV avoidance operation point C2 is performed.

In FIG. 7, an operation point C3 in case of performing the first operation and an operation point C4 in case of performing the second operation are illustrated as the NV avoidance operation points in case of performing the EGR operation. The operation points C3 and C4 are respectively determined as two operation points present on an equal power line A from on an operation line in case of performing the first operation and an operation line in case of performing the second operation.

The NV avoidance operation point C3 in case of performing the first operation is determined as an operation point within an NV avoidance line in case of performing the first operation. Similarly, the NV avoidance operation point C4 in case of performing the second operation is determined as an operation point within an NV avoidance line in case of performing the second operation. In addition, the NV avoidance lines in case of performing the EGR operation are different from the NV avoidance lines (refer to FIG. 6) in case of performing the EGR-less operation. This originates from being brought into a state where vibration is apt to be generated due to introduction of the EGR, and the NV avoidance lines in case of performing the EGR operation are located on the right of the NV avoidance lines in case of performing the EGR-less operation in both the case where the first operation is performed and the case where the second operation is performed. Hence, options of the NV avoidance operation points in case of performing the EGR operation are limited compared to the case where the EGR-less operation is performed.

The NV avoidance operation points C3 and C4 in case of performing the EGR operation are also determined as operation points located in an EGR allowable region above an EGR boundary for determining whether or not the EGR operation can be executed. The EGR boundary is set as a value that does not generate deposits, for example, in a direct injection type engine.

There is no particular problem when the operation points can be determined in the EGR allowable region above the EGR boundary as in the operation points C3 and C4. However, when operation points should be determined in an EGR unallowable region below the EGR boundary due to the relationship between an equal power line and operation lines, the operation points are obtained on the premise that the EGR operation cannot be performed. In such a case, the operation points may be performed using the graph of FIG. 6 corresponding to the EGR-less operation.

If the thermal efficiencies of the NV avoidance operation points C3 and C4 are compared with each other, it can be understood that the NV avoidance operation point C3 in case of performing the first operation is located further inside the thermal efficiency contour line than the NV avoidance operation point C4 in case of performing the second operation. Hence, the thermal efficiency $\eta_{C3}$ of the NV avoidance operation point C3 in case of performing the first operation is determined to be higher than the thermal efficiency $\eta_{C4}$ of the NV avoidance operation point C4 in case of performing the second operation (namely, $\eta_{C3} > \eta_{C4}$).

As a result, in the engine 200, the first operation is realized, and operation in the NV avoidance operation point C3 is performed.

In FIG. 7, an operation point C5 in case of performing the first operation and an operation point C6 in case of performing the second operation are also illustrated as the NV avoidance operation points in case of performing the EGR operation. The operation points C5 and C6 are respectively determined as two operation points present on an equal power line B for outputting a larger amount of power than the equal power line A from on an operation line in case of performing the first operation and an operation line in case of performing the second operation.

The NV avoidance operation points C5 and C6 are determined as operation points within NV avoidance lines in case of performing the first operation and in case of performing the second operation, similar to the above-described NV avoidance operation points C3 and C4. The NV avoidance operation points C5 and C6 are determined as operation points located in an EGR allowable region above an EGR boundary for determining whether or not the EGR operation can be executed, similar to the above-described NV avoidance operation points C3 and C4.

If the thermal efficiencies of the NV avoidance operation points C5 and C6 are compared with each other, it can be understood that the NV avoidance operation point C6 in case of performing the second operation is located further inside a thermal efficiency contour line than the NV avoidance operation point C5 in case of performing the first operation. Hence, here, the thermal efficiency $\eta_{C6}$ of the NV avoidance operation point C6 in case of performing the second operation is determined to be higher than the thermal efficiency $\eta_{C5}$ of the NV avoidance operation point C5 in case of performing the first operation (namely, $\eta_{C5} > \eta_{C6}$).

As a result, in the engine 200, the second operation is realized, and operation in the NV avoidance operation point C6 is performed.

Here, as can be understood also from the relationship between the operation points C3 and C4 and the relationship between the operation points C5 and C6, thermal efficiency in either the first operation or the second operation is higher or changes even if the other conditions are the same if the required driving power varies. Incidentally, although only a case where the required driving power varies has been described herein, the relationship of the thermal efficiency can be reversed also when other parameters (for example, the vehicle speed, the presence/absence of the EGR) or the like are different.

In contrast, according to the control device for an internal combustion engine related to the present embodiment, an operation with higher thermal efficiency can be appropriately selected and realized even in a case where the thermal efficiency changes due to differences between slight conditions after generation of vibration is taken into consideration. Therefore, it is possible to extremely efficiently operate the internal combustion engine without causing a decline in drivability caused by generation of vibration.

The invention is not limited to the above-described embodiment, and can be appropriately changed without departing from the scope or concept of the invention that can be read throughout the claims and the specification, and control devices for an internal combustion engine accompanied with such change are also included in the technical scope of the invention.

What is claimed is:

1. A control device for an internal combustion engine, the control device comprising:
   an electronic control unit configured to:
   (i) perform switching between a first operation and a second operation, wherein the first operation is an operation with all cylinders being operated and the second operation is an operation with cylinder deactivation;
   (ii) determine an operation point where vibration based on an operational state of the internal combustion engine is equal to or lower than a predetermined value when performing the first operation, and determine an operation point where vibration based on the operational state of the internal combustion engine is equal to or lower than a predetermined value when performing the second operation;

(iii) determine which one of a thermal efficiency in the operation point in case of performing the first operation and a thermal efficiency in the operation point in case of performing the second operation is higher; and (iv) control the operational state of the internal combustion engine so as to operate in the operation point where the thermal efficiency is determined to be higher.

2. The control device according to claim 1,
wherein the internal combustion engine includes an exhaust gas recirculation system that recirculates exhaust gas to an intake side, and
wherein the electronic control unit is configured to determine the operation point based on whether or not exhaust gas recirculation is performed during the operation of the internal combustion engine.

3. The control device according to claim 2,
wherein the electronic control unit is configured to determine which one of the thermal efficiency in the operation point in case of performing the first operation and the thermal efficiency in the operation point in case of performing the second operation is higher, based on a change in the thermal efficiency in case of performing the exhaust gas recirculation during the operation of the internal combustion engine with respect to the thermal efficiency in case of not performing the exhaust gas recirculation during the operation of the internal combustion engine, in case of performing the exhaust gas recirculation during the operation of the internal combustion engine.

4. A control method for an internal combustion engine controlled by an electronic control unit, the control method comprising:
switching, by the electronic control unit, between a first operation and a second operation, wherein the first operation is an operation with all cylinders being operated and the second operation is an operation with cylinder deactivation;
determining, by the electronic control unit, an operation point where vibration based on an operational state of the internal combustion engine is equal to or lower than a predetermined value when performing the first operation, and determine an operation point where vibration based on the operational state of the internal combustion engine is equal to or lower than a predetermined value when performing the second operation;
determining, by the electronic control unit, which one of a thermal efficiency in the operation point in case of performing the first operation and a thermal efficiency in the operation point in case of performing the second operation is higher; and
controlling, by the electronic control unit, the operational state of the internal combustion engine so as to operate in the operation point where the thermal efficiency is determined to be higher.

* * * * *